United States Patent
Salvador et al.

(10) Patent No.: US 7,862,942 B2
(45) Date of Patent: Jan. 4, 2011

(54) STRATEGIES FOR MITIGATING CELL DEGRADATION DURING START-UP AND SHUTDOWN WITH H2/N2 STORAGE

(75) Inventors: John P. Salvador, Penfield, NY (US); Balsu Lakshmanan, Pittsford, NY (US); Abdullah B. Alp, West Henrietta, NY (US); David A. Arthur, Honeoye Falls, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 984 days.

(21) Appl. No.: 11/669,893

(22) Filed: Jan. 31, 2007

(65) Prior Publication Data
US 2008/0182138 A1    Jul. 31, 2008

(51) Int. Cl.
*H01M 8/04* (2006.01)
(52) U.S. Cl. ............... 429/429; 429/408; 429/428; 429/483; 429/492
(58) Field of Classification Search .......... 429/17, 429/34
See application file for complete search history.

(56) References Cited

U.S. PATENT DOCUMENTS

| | | | |
|---|---|---|---|
| 3,976,506 A * | 8/1976 | Landau .................... | 429/17 |
| 6,887,609 B2 * | 5/2005 | Kaufmann ................ | 429/34 |
| 2005/0003257 A1 * | 1/2005 | Willimowski et al. ..... | 429/34 |
| 2005/0147855 A1 | 7/2005 | Reiser et al. | |
| 2007/0072020 A1 * | 3/2007 | Arthur et al. ............. | 429/22 |

* cited by examiner

*Primary Examiner*—Dah-Wei D Yuan
*Assistant Examiner*—Patricia Davis
(74) *Attorney, Agent, or Firm*—John A. Miller; Miller IP Group, PLC

(57) ABSTRACT

A system and method for reducing cathode carbon corrosion during start-up of a fuel cell stack. If a long enough period of time has gone by since the last system shutdown, then both the anode side and the cathode side of the stack will be filled with air. If the system includes split sub-stacks, then a start-up sequence uses a fast hydrogen purge through each sub-stack separately so as to minimize the time of the hydrogen/air front flowing through the anode side of the stacks. The start-up sequence then employs a slow hydrogen purge through the sub-stacks at the same time. If the time from the last shutdown is short enough where a significant amount of hydrogen still exists in the cathode side and the anode side of the sub-stacks, then the fast hydrogen purge can be eliminated, and the start-up sequence proceeds directly to the slow hydrogen purge.

16 Claims, 1 Drawing Sheet

STRATEGIES FOR MITIGATING CELL DEGRADATION DURING START-UP AND SHUTDOWN WITH H2/N2 STORAGE

BACKGROUND OF THE INVENTION

1. Field of the Invention

This invention relates generally to a system and method for reducing catalyst degradation in the MEAs of a fuel cell stack at system start-up and, more particularly, to a system and method for reducing cathode catalyst degradation in the MEAs of a fuel cell stack at system shutdown and start-up that includes determining an anode purge velocity and time depending on how long the stack has been shutdown.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

When a fuel cell system is shut down, un-reacted hydrogen gas remains in the anode side of the fuel cell stack. This hydrogen gas is able to diffuse through or cross over the membrane and react with the oxygen in the cathode side. As the hydrogen gas diffuses to the cathode side, the total pressure on the anode side of the stack is reduced below ambient pressure. This pressure differential draws air from ambient into the anode side of the stack. When the air enters the anode side of the stack it generates an air/hydrogen front that creates a short circuit in the anode side, resulting in a lateral flow of hydrogen ions from the hydrogen flooded portion of the anode side to the air-flooded portion of the anode side. This high ion current combined with the high lateral ionic resistance of the membrane produces a significant lateral potential drop (~0.5 V) across the membrane. This produces a local high potential between the cathode side opposite the air-filled portion of the anode side and adjacent to the electrolyte that drives rapid carbon corrosion, and causes the carbon layer to get thinner. This decreases the support for the catalyst particles, which decreases the performance of the fuel cell.

It is known in the art to purge the hydrogen gas out of the anode side of the fuel cell stack at system shutdown by forcing air from the compressor into the anode side at high pressure. The air purge also creates an air/hydrogen front that causes the cathode carbon corrosion, as discussed above. Thus, it is desirable to reduce the air/hydrogen front residence time to be as short as possible, where the front residence time is defined as the anode flow channel volume divided by the air purge flow rate. Higher purge rates will decrease the front residence time for a fixed anode flow channel volume.

It is also known in the art to provide cathode re-circulation to reduce cathode corrosion at system shutdown. Particularly, it is known to pump a mixture of air and a small amount of hydrogen through the cathode side of the stack at system shut-down so that the hydrogen and oxygen combine in the cathode side to reduce the amount of oxygen, and thus the potential that causes the carbon corrosion.

It is also known to short circuit the stack with a resistor at system shut-down to reduce the amount of oxygen on the cathode side of the stack, and thus cathode side corrosion. It has been shown that these two techniques do provide mitigation of carbon corrosion on the cathode side of the stack. However, improvements can be made.

At the next system start-up, assuming enough time has gone by, both the cathode and anode flow channels are generally filled with air. When hydrogen is introduced into the anode flow channels at system start-up, the hydrogen pushes out the air in the anode flow channels also creating a hydrogen/air front that travels through the anode flow channels. The hydrogen/air front causes a catalytic reaction along the length of the membrane in each fuel cell as the front moves that, in combination with the reaction across the membrane, creates a high electric voltage potential. This combined electric voltage potential is high enough to severely degrade the catalyst and the carbon particles on which the catalyst is formed, reducing the life of the MEAs in the fuel cell stack. Particularly, the reaction created by the hydrogen/air front in combination with the normal fuel cell reaction is orders of magnitude greater than only the fuel cell reaction across the membrane. For example, it has been shown that without addressing the degradation effects of the hydrogen-air front at system start-up, it only takes about 100 shutdown and start-up cycles to destroy the fuel cell stack in this manner.

It has been proposed in the art to reduce the degradation effect of the hydrogen/air front at system start-up by forcing hydrogen through the anode flow channels as quickly as possible so as to reduce the time that the degradation occurs. It has also been suggested to introduce hydrogen into the anode flow channels at a slow rate to provide active mixing of the air and hydrogen to eliminate the hydrogen/air front. It has also been proposed in the art to cool the fuel cell before removing the hydrogen from the anode flow channels. However, all of these solutions have not reduced the hydrogen/air degradation enough to provide a desired lifetime of the fuel cell stack. Particularly, moving the hydrogen/air front quickly does not completely eliminate the degradation of the catalyst, and requires over-sized piping and other components to rapidly purge the air from the anode flow channels. Introducing the hydrogen slowly at start-up has the disadvantage of requiring a recirculation pump that takes several minutes to completely remove the air from the anode flow channels. Further, requiring precise control of the amount of hydrogen into the anode flow channels is difficult to implement.

It has also been proposed in the art to replace the materials in the MEAs so that the carbon is less susceptible to the hydrogen-air reaction. One example is to use graphitized carbon. However, there are certain problems with this solution that reduce the performance of the fuel cell stack.

It has also been proposed in the art to provide a load across the fuel cell stack, such as a resistor, to reduce the electric potential generated by the hydrogen/air front. However, an extremely low resistance load will require electrical components with a high power rating. Also, flow and balancing between cells in a fuel cell stack can result in corrosion to the cell anodes. Furthermore, in most embodiments, a resistor is typically not sufficient on its own to minimize carbon corrosion.

SUMMARY OF THE INVENTION

In accordance with the teachings of the present invention, a system and method are disclosed for reducing cathode carbon corrosion during shutdown and start-up of a fuel cell stack. At system shutdown, the cathode airflow is stopped and the cathode side of the stack is sealed. The flow of hydrogen to the anode side of the stack is continued so that any remaining oxygen in the stack is consumed. The anode side of the stack is sealed so that the flow is only to replace hydrogen that has been pumped to the cathode side of the stack, rather than a flow of hydrogen that exits the anode sub-system. When the stack power drops to a predetermined level, the current generated by the stack is sent to a certain system component, such as a battery. When the stack power decreases to another predetermined level, the stack load is switched to a resistor. Once the oxygen has been consumed from the stack, the hydrogen flow is turned off and the anode side of the stack is sealed so that both the anode side and the cathode side of the stack have an $N_2/H_2$ mixture.

If a long enough period of time has gone by since the last system shutdown, then both the anode side and the cathode side of the stack will be filled with air. If the system includes split sub-stacks, then a start-up sequence uses a fast hydrogen purge through each sub-stack separately so as to minimize the time of the hydrogen/air front flowing through the anode side of the stacks. Additionally, a compressor is operated to provide cathode air to a cathode exhaust gas line that by-passes the sub-stacks so that any hydrogen that may exist in the purge gas is diluted. The start-up sequence then employs a slow hydrogen purge through the sub-stacks at the same time, where the compressor will flow air to the cathode side of the stack. If the time from the last shutdown is short enough where a significant amount of hydrogen still exists in the cathode side and the anode side of the sub-stacks, then the fast hydrogen purge can be eliminated, and the start-up sequence proceeds directly to the slow hydrogen purge.

Additional features of the present invention will become apparent from the following description and appended claims, taken in conjunction with the accompanying drawings.

DETAILED DESCRIPTION OF THE EMBODIMENTS

Figure 1:
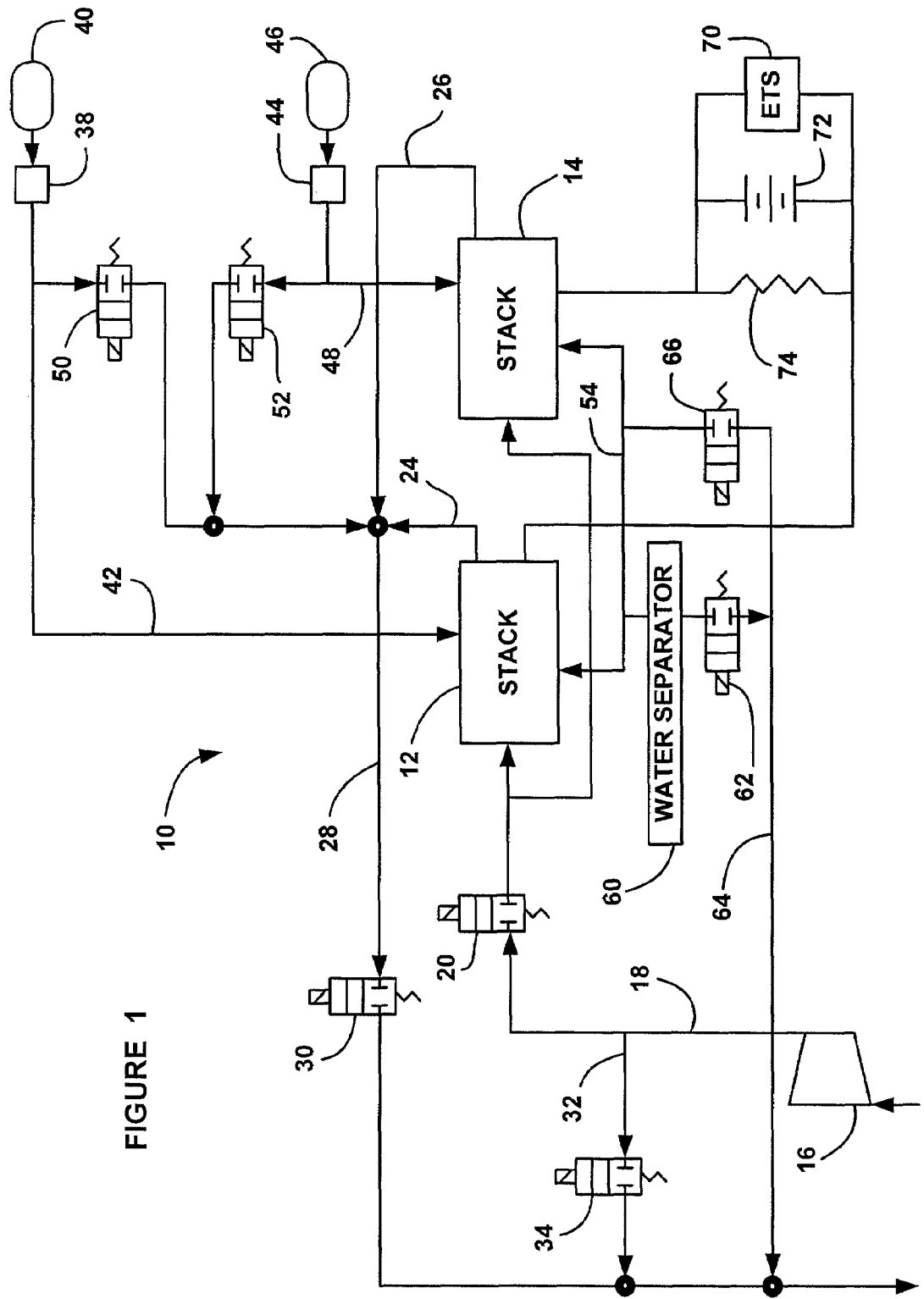
FIG. 1 is a schematic block diagram of a fuel cell system that employs various techniques for reducing cathode carbon degradation at system shutdown and start-up, according to an embodiment of the present invention.

The following discussion of the embodiments of the invention directed to a system and method for minimizing cathode carbon degradation at system shutdown and start-up is merely exemplary in nature, and is in no way intended to limit the invention or its applications or uses.

FIG. 1 is a schematic block diagram of a fuel cell system 10 including a first split fuel cell stack 12 and a second split fuel cell stack 14. A compressor 16 provides cathode input air on cathode input line 18 to the split stacks 12 and 14 through a normally closed cathode input valve 20. Cathode exhaust gas is output from the split stack on line 24 and cathode exhaust gas is output from the split stack 14 on line 26 where the cathode exhaust gas is combined into a single cathode output line 28. A normally closed cathode back pressure valve 30 controls the flow of the cathode exhaust gas through the line 28. A cathode by-pass line 32 between the input line 18 and the output line 28 allows the cathode input air to by-pass the stacks 12 and 14. A normally closed by-pass valve 34 controls whether the cathode air by-passes the stacks 12 and 14. If the valves 20 and 30 are closed and the valve 34 is open, then air from the compressor 16 will by-pass the stacks 12 and 14. Typically, a cathode humidification unit (not shown) will be provided at a suitable location in the cathode input line 18.

In this non-limiting embodiment, the split stacks 12 and 14 employ anode flow shifting where the anode reactant gas flows back and forth through the split stacks 12 and 14 at a predetermined cycle in a manner that is well understood to those skilled in the art. An injector 38 injects hydrogen gas from a hydrogen gas source 40 through anode line 42 to the split stack 12 and an injector 44 injects hydrogen gas from a hydrogen source 46 through anode line 48 to the split stack 14 in an alternating sequence. Normally closed anode flow shifting valves 50 and 52 are used to provide the anode flow shifting. When the valve 50 is closed and the valve 52 is opened, hydrogen gas from the source 40 flows into the stack 12 on the line 42, through a connector line 54 between the split stacks 12 and 14, into the split stack 14 and out the anode line 46 through the valve 52 to be mixed with the cathode exhaust gas in the cathode exhaust gas output line 28. Likewise, when the valve 52 is closed and the valve 50 is opened, hydrogen gas from the hydrogen source 46 flows into the split stack 14 on the line 46, through the connector line 54, into the split stack 12 and through the valve 50 to be mixed with the cathode exhaust gas in the line 28.

A water separator 60 is coupled to the connector line 54 and collects water in the anode gas flow between the split stacks 12 and 14. A normally closed drain valve 62 is periodically opened to vent the water to the cathode exhaust gas line 28 on line 64. Further, an anode exhaust gas purge valve 66 is coupled to the connector line 54 and the line 64 for reasons that will become apparent from the discussion below.

The fuel cell stacks 12 and 14 generate current. During normal stack operation, the current generated by the stacks 12 and 14 is used to drive system loads, such as an electrical traction system (ETS) 70 on a vehicle. As will be discussed in further detail below, during a shutdown sequence, the current generated by the stacks 12 and 14 may be used to charge a battery 72, or be dissipated by other system components, and then be dissipated by a resistor 74.

At system shutdown, the compressor 16 is stopped and the valves 20 and 30 are closed to seal the cathode side of the stacks 12 and 14. The flow of hydrogen is continued so that any remaining oxygen in the stacks 12 and 14 is consumed. When the stack power drops to a predetermined level, the current generated by the stacks 12 and 14 is switched from the ETS 70 to the battery 72. When the stack power decreases to another predetermined level, the stack load is switched to the resistor 74. Particularly, once the voltage has degraded to a fixed cutoff voltage, the stack load is switched to the resistor 74. The cutoff voltage could be the lower limit of a DC/DC converter (not shown), or the lower limit of a power device. The objective of the battery load is to consume and/or store any energy that otherwise would have been wasted. It also reduces the energy consumption requirements of the resistor load.

Once the oxygen has been consumed from the stacks 12 and 14, the hydrogen flow is turned off and the valves 50, 52, 62 and 66 are closed to seal the anode side of the stacks 12 and 14. When the system 10 is shutdown in this manner, the stacks 12 and 14 include an $N_2/H_2$ mixture in both the cathode side and the anode side. Over time, air will leak into the stacks 12 and 14, and the hydrogen in the stack 12 and 14 will initially consume the oxygen. Additionally, the hydrogen will slowly leak out of the stacks 12 and 14. As a result, the composition of the gases within the stacks 12 and 14 will vary over time between a hydrogen rich mixture in nitrogen and water to an air mixture.

The present invention proposes a certain sequence of steps at the next system start-up to minimize cathode catalyst corrosion. The sequence of steps will vary depending on how long the system 10 has been shutdown, i.e., how far the anode side and the cathode side of the stacks 12 and 14 have transitioned from a hydrogen/nitrogen mixture to air. The sequence is separated into a fast hydrogen purge state and a slow hydrogen purge state of the anode side of the stacks 12 and 14. As will be discussed in detail below, the velocity of the hydrogen flow through the anode side of the stacks 12 and 14 and the length of time of the two states will depend on the time that the system 10 has been shutdown, the ambient temperature and other factors, where the length of time from the previous system shutdown is recorded.

It is known in the art to force hydrogen through the anode side of the stacks 12 and 14 as quickly as possible at system start-up so as to minimize the time that the hydrogen/air front exists in the anode flow channels that causes cathode catalyst degradation. From testing and various calculations, it is known how long it takes for the stacks 12 and 14 to fill with air after a system shutdown. If the stacks 12 and 14 do not contain a significant amount of air, then a slower hydrogen/air front is acceptable. If the stacks 12 and 14 do contain a significant amount of air, then a fast hydrogen/air front speed is better.

When the initial hydrogen air front flows through the stacks 12 and 14, the resistor 74 is enabled across the stack. The resistor 74 serves to partially suppress the cathode voltage. Typically, the resistor 74 has a small resistance to provide a higher power flow and lower the carbon corrosion. In the same manner, the faster the hydrogen/air front, the lower the carbon corrosion.

Assuming that the system 10 has been shutdown for a long enough period of time for the stacks 12 and 14 to fill with air, the system 10 will perform the fast hydrogen purge state first. According to the invention, the split stacks 12 and 14 are separately purged with hydrogen at system start-up. During the start-up sequence, the water vapor trap 60 is empty. The injector 38 is controlled so that a predetermined amount of hydrogen is injected into the stack 12 at a high velocity. The drain valve 62 and the purge valve 66 are opened so that the air within the anode side of the split stack 12 is forced through the connector line 54, through the valves 62 and 66, through the line 64 and into the cathode exhaust gas line 28. The compressor 16 is operated and the by-pass valve 34 is opened so that so air is mixed with the anode purge gas to further dilute any hydrogen that may exist. As the stack 12 is being purged, the gas being pushed through the drain valve 62 and the purge valve 66 will first be air, then a mixture of hydrogen and air, and then almost pure hydrogen. The amount of hydrogen that can be forced through the split stack 12 is relative to the amount of dilution that can be provided by the compressor air. In one embodiment, the concentration of hydrogen that can be output to the environment needs to be less than 4%. Once the stack 12 is purged, then the injector 44 is turned on to purge the split stack 14 through the drain valve 62 and the purge valve 66 in the same manner. Therefore, high gas velocity can be used to quickly purge the anode side of the split stacks 12 and 14 separately to reduce the hydrogen/air front residence time through the split stacks 12 and 14.

Because only one of the split stacks 12 and 14 is being purged at a time, the purge can be quicker because the pipes can accept a higher volume of gas from one stack as opposed to a combination of two stacks. Flowing hydrogen to one stack at a time would double the velocity through each sub-stack for the same exhaust flow rate. The velocity of the hydrogen from the sources 40 and 44 directly sets the pressure within the anode side of the split stacks 12 and 14. In one non-limiting embodiment, the injectors 38 and 44 force the hydrogen through the split stacks 12 and 14 for a period in the range of 0.1-0.4 seconds at a pressure of about 40 kPa. Further, the first stack that hydrogen flows to should be randomized.

The amount of hydrogen that is used to purge the split stacks 12 and 14 can be calculated based on the volume of the anode side of the stacks 12 and 14, the temperature of the stacks 12 and 14 and the pressure within the split stacks 12 and 14. The hydrogen flow into the stacks 12 and 14 should be roughly one anode volume. If an insufficient amount of hydrogen flows into the stack, some of the fuel cells might be left containing an $H_2/O_2$ front. If too much hydrogen flows into the first stack, excess hydrogen is wasted to the exhaust and might enter into the second stack through compression leading to a stagnant hydrogen/air front causing excessive voltage degradation. The loop volume for each of the stacks is calculated and this information is combined with the hydrogen flow rate during the start-up to determine the purge time for the first stack.

Once both of the split stacks 12 and 14 have been purged as discussed above, then the system 10 proceeds to the slow hydrogen purge state. In this state, both of the injectors 38 and 44 are operated at the same time for a certain period of time at a lower flow rate to provide parallel hydrogen flow through the stacks 12 and 14. For the slow hydrogen purge state, the purge valve 66 is closed and the drain valve 62 is opened. The drain valve 62 has a much smaller opening that the purge valve 66, and thus less purge gas can flow therethrough. Further, the by-pass valve 34 is gradually closed during the slow purge state to send the compressor air through the stacks 12 and 14. In one non-limiting embodiment, the pressure of the anode side of the stack 12 or 14 is about 25 kPa greater than the pressure in the cathode side of the stack 12 or 14 during the slow hydrogen purge state.

If the system 10 has only been shutdown for a short period of time where there is still mostly, or almost mostly, hydrogen and nitrogen in the anode and cathode sides of the stacks 12 and 14, then the fast hydrogen purge state is eliminated and only the slow hydrogen purge state is used. Particularly, the split stacks 12 and 14 are not separately purged with high velocity hydrogen. The start-up sequence goes directly to the parallel purge of the stacks 12 and 14 through the drain valve 62 at low hydrogen velocity.

As discussed above, the start-up sequence is adjusted depending on how long the system 10 has been shutdown and other factors that determine how much air is in the anode flow channels. The velocity of the hydrogen purge can be controlled for both the fast hydrogen purge state and the slow hydrogen purge state. Further, the time of the purge can be controlled. A characteristic curve can be generated for the system 10 that defines the amount of hydrogen remaining in the stacks 12 and 14 as a function of the time since the last shutdown. This curve is the inverse of the air infiltration into the stack as a function of time from the last shutdown. Based on these curves, there is a resulting curve that is the minimum hydrogen required at start-up for reliability as a function of time since the last shutdown. This minimum hydrogen required can then be flowed as fast as desired up to the maximum hydrogen concentration in the exhaust requirement. Slower hydrogen flows will be a longer, flatter exhaust concentration curve. Faster hydrogen flows will be a shorter, pulse-like exhaust concentration curve.

It is possible that the system 10 could have a quick shutdown or an unintended shutdown where the amount of hydrogen in the stacks 12 and 14 would not be known. A fail-safe restart can be used in this case that employs a slow enough hydrogen flow rate so that even if the system has a 100% hydrogen emissions through the stacks 12 and 14 to the cathode exhaust line 28, the concentration of hydrogen in the exhaust gas is still acceptable. Further, the fail-safe restart should have a long enough hydrogen flow rate so that even if the system had 0% hydrogen gas, the stacks 12 and 14 would be completely filled with hydrogen before any load on the stacks 12 and 14 is drawn.

As discussed above, the system 10 employs anode flow shifting. However, other systems may employ anode recirculation where the anode exhaust gas is sent back to the anode input in a manner that is well understood to those skilled in the art. All or most of the various steps for shutdown and start-up that minimize cathode catalyst corrosion discussed above can be employed for those types of systems as well.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for starting a fuel cell system, said system including a first split stack and a second split stack, said method comprising: flowing a purge gas at a first flow rate through an anode side of the first split stack and a purge valve coupled between the first and second split stacks for a first period of time; flowing the purge gas at the first flow rate through an anode side of the second split stack and the purge valve for a second period of time after the first period of time; and flowing the purge gas at a second flow rate through the anode sides of both the first split stack and the second split stack for a third period of time after the second period of time, where the second flow rate is slower than the first flow rate and flowing the purge gas into a cathode exhaust gas line after the purge valve.

2. The method according to claim 1 further comprising operating a compressor so that compressor air flows to the cathode exhaust gas line to dilute the purge gas without flowing through the first split stack and the second split stack during the first and second periods of time.

3. The method according to claim 1 further comprising flowing air through a cathode side of the first split stack and the second split stack during the third period of time.

4. The method according to claim 1 wherein flowing the purge gas includes flowing a hydrogen gas.

5. The method according to claim 1 wherein flowing the purge gas at a second flow rate includes flowing the purge gas through a water separator and drain valve coupled between the first and second split stacks and not through the purge valve.

6. The method according to claim 1 wherein the first flow rate, the second flow rate, the first period of time, the second period of time and the third period of time are all controlled based on how long the fuel cell system has been shutdown.

7. The method according to claim 6 wherein the first and second periods of time is zero if the fuel cell system has been shutdown for a short enough period of time where a significant amount of air has not entered the first and second split stacks.

8. The method according to claim 1 wherein the system selects whether the purge gas will be flowed to the first split stack or the second split stack during the first period of time and the second period of time in a random manner.

9. The method according to claim 1 wherein the system employs anode flow shifting.

10. A method for starting a fuel cell system, said system including a fuel cell stack and a compressor for flowing air through a cathode side of the fuel cell stack, said method comprising:
selectively flowing a purge gas at a first flow rate through an anode side of the fuel cell stack and a purge valve for a first period of time; and
selectively flowing the purge gas at a second flow rate through the anode side of the fuel cell stack for a second period of time after the first period of time, wherein the second flow rate is slower than the first flow rate, and wherein the first flow rate, the second flow rate, the first period of time and the second period of time are determined based on how long the system has been shutdown.

11. The method according to claim 10 wherein the first period of time is zero if the fuel cell system has been shutdown for a short enough period of time where a significant amount of air has not entered the stack.

12. The method according to claim 10 further comprising flowing the purge gas into a cathode exhaust gas line after the purge valve.

13. The method according to claim 12 further comprising flowing compressor air to the cathode exhaust gas line to dilute the purge gas without flowing the air through the stack during the first period of time.

14. The method according to claim 10 further comprising flowing compressor air through a cathode side of the fuel cell stack during the second period of time.

15. The method according to claim 10 wherein flowing the purge gas includes flowing a hydrogen gas.

16. The method according to claim 10 wherein flowing the purge gas at a second flow rate includes flowing the purge gas through a water separator and drain valve and not through the purge valve.

* * * * *